No. 609,619. Patented Aug. 23, 1898.
M. JOLLY.
RAILROAD TIME INDICATOR.
(Application filed Jan. 20, 1898.)

(No Model.)

Witnesses:—
Louis M. T. Whitehead

Morgan Jolly Inventor:—
By his Attorneys,
C. A. Snow & Co.

UNITED STATES PATENT OFFICE.

MORGAN JOLLY, OF WYNNE, ARKANSAS.

RAILROAD TIME-INDICATOR.

SPECIFICATION forming part of Letters Patent No. 609,619, dated August 23, 1898.

Application filed January 20, 1898. Serial No. 667,327. (No model.)

*To all whom it may concern:*

Be it known that I, MORGAN JOLLY, a citizen of the United States, residing at Wynne, in the county of Cross and State of Arkansas, have invented a new and useful Railroad Time-Indicator, of which the following is a specification.

My invention relates to a time-indicator or schedule-testing apparatus for use in railway-train service, and has for its object to provide a simple device adapted to indicate the proper time at which a train starting at a given time and traveling at a known or schedule rate of speed will reach any given station on the line of that road, to avoid the necessity of calculation upon the part of station agents and other officials of the road, and particularly advantageous to the train dispatcher in issuing special time-cards by telegraph.

Further objects and advantages of this invention will appear in the following description, and the novel features thereof will be particularly pointed out in the appended claims.

Figure 1:
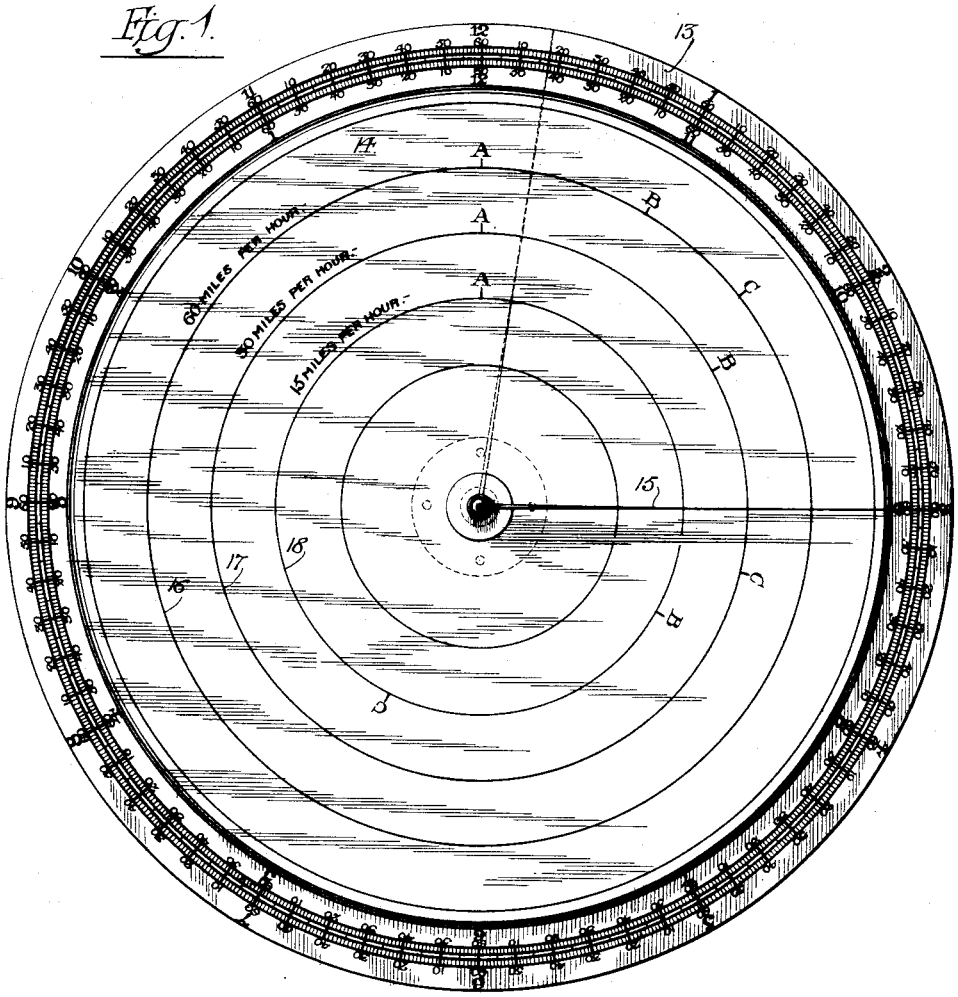
Figure 2:
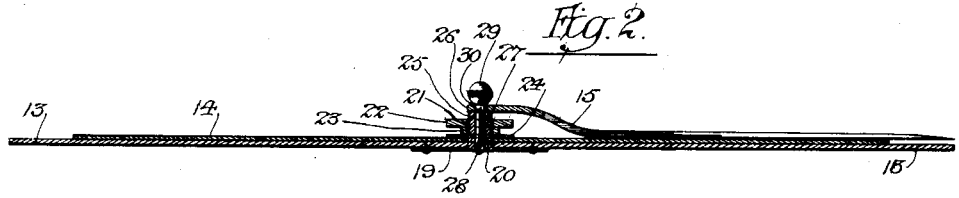

In the drawings, Figure 1 is a plan view of an indicator constructed in accordance with my invention, showing in dotted lines different positions of the index. Fig. 2 is a central sectional view of the same.

Similar numerals of reference indicate corresponding parts in both figures of the drawings.

The apparatus embodying my invention consists, essentially, of a time-dial 13, having a continuous annular scale graduated to indicate hours and fractions thereof, the scale being double, to progress in opposite directions from a given point, (indicated in the construction illustrated by the hour-numerals 12,) a station-dial 14, mounted for rotary adjustment upon the time-dial and provided with a plat indicating relative distances between stations upon the line of the railroad for which the indicator is designed, and an index or pointer 15, mounted coaxially with the station-dial and adapted to traverse the same and the time-dial. The station-dial is of less diameter than the time-dial in order to expose the graduated scale of the latter, and upon the surface of the station-dial is arranged a series of concentric lines 16 17 18, &c., preferably inscribed with the speed per mile of different trains traversing the road, as "60 miles per hour," "30 miles per hour," &c. Also, these concentric lines or paths are marked at intervals, as shown at A B C, &c., representing different stations upon the road, the same station characters being used upon all of the concentric lines, but being spaced at different intervals to correspond with the relative speeds of the trains traversing the road. For instance, the station-marks A and B on the route-line 17, which is designed to represent a train traveling at a rate of thirty miles per hour, are arranged at an angular interval which is double that between the station characters A and B on the route-line 16, which represents a train traveling at the rate of sixty miles per hour, and are arranged at one-half the angular interval which is indicated between the station characters A and B on the route-line 18. Obviously the speeds and the intervals between the station characters on the route-lines must be suited to the particular road for which the indicator is designed. In the construction illustrated the angular interval between the station characters A and B on the route-line 16 is supposed to represent sixty miles, or the distance which a train traveling at the rate of sixty miles per hour will traverse in one hour, while the station characters on the route-line 17 are arranged at an angular interval representing sixty miles, or the distance which a train traveling at the rate of thirty miles per hour will traverse in two hours, and so on.

Both the station-dial and the index or pointer are adjustable, and when it is desired to ascertain when a train traveling at a known rate of speed will reach a certain station on the line, said train having left a previous station at a given time, the station-dial is turned to dispose the character representing the station of departure on a radial line passing through the time of departure indicated on the dial, whereupon the index or pointer should be moved to occupy a position upon a line passing through the character representing the station of arrival, when the extremity of the pointer will indicate on the time-dial the time of such arrival. For instance, if it is desired to ascertain when a train traveling at sixty miles per hour and leaving station A at twelve o'clock will reach station B, station character A of the station-dial is arranged upon a radial line passing through the hour-numeral 12 of the time-dial and the index or pointer is moved to occupy a position upon a radial line passing through the station character B on the sixty-mile route-line, when it will be seen that the extremity of the pointer indicates one o'clock on the time-dial. In the same way it can be ascertained that a train traveling at the rate of thirty miles per hour will reach station B at two o'clock, while a train traveling at the rate of fifteen miles per hour will reach the station B at four o'clock. If the interval between the station B and the station C of the railroad in question is forty-three miles, a train traversing the road at a rate of sixty miles per hour and leaving station A at twelve o'clock will arrive at station C at 1.43, while a train leaving the station A at the same hour and traveling at a rate of fifteen miles per hour will reach the station C at 6.52. Hence with an indicating device having a time-dial graduated as described, a station-dial provided with route-lines subdivided to form intervals corresponding with distances between destination-points, different route-lines representing different rates of speed of trains traversing the road, in connection with a pointer mounted as described, an operative can ascertain the schedule time of arrival of any train at any desired station provided he knows the departure time of the train from a previous station and the speed of the train.

The time-dial is preferably provided with duplicate lines of graduations extending, respectively, in opposite directions, whereby when calculations are to be made as to the arrivals and departures of trains traveling in one direction, as from A to B and to C, &c., the outer series of graduations is utilized, whereas with trains traveling in the opposite direction, as from C to B and to A, &c., the inner line of graduations is utilized.

As a means of facilitating the operation of the device comprising the essential features above described I preferably employ a disk 19, secured to the under surface of the time-dial and provided with a post 20, extending perpendicularly through a central opening in said dial and also through a corresponding opening in the station-dial. This post is provided with a threaded portion 21, upon which is fitted a clamp-nut 22, having a bearing-collar 23 for contact with a washer 24, bearing upon the surface of the station-dial and adapted to be forced into frictional contact therewith to clamp said station-dial against accidental displacement after it has been adjusted to the desired position with relation to the time-dial. The portion of the post 20 above the threaded surface 21 forms a smooth spacing-shoulder 25, upon which rests a hub 26 of the index or pointer 15, and extending through the hub of the index is a spindle 27, consisting of a split pin which fits in an axial bore 28 of the post 20 and is held in frictional contact with the walls thereof to maintain the index or pointer against accidental displacement, while allowing it to be turned freely by means of a knob 29 at the upper end of said spindle. The spindle is provided with an angular collar 30 to fit in the correspondingly-shaped opening in the hub 26. The adjustment of the index or pointer is wholly independent of the adjustment of the station-dial, and the clamp-screw 22 may be loosened to allow said station-dial to be adjusted independently of the pointer without disturbing the adjustment of the former, owing to the spacing-shoulder 25, which extends above the normal plane of the upper side of the screw 22.

It will be understood that various changes in the form, proportion, and the minor details of construction may be resorted to without departing from the spirit or sacrificing any of the advantages of this invention.

Having described my invention, what I claim is—

1. An indicator having a graduated time-dial, and a station or distance dial arranged coaxially with the time-dial, and one of them being revolubly movable independently of the other, said station or distance dial having a route-line divided to represent angular distances between stations, and an index or pointer extending radially with relation to the surfaces of said dials, and movable independently thereof, substantially as specified.

2. An indicator having a graduated time-dial, a station-dial having concentric route-lines divided, respectively, to indicate relative angular intervals denoting distances between stations, and an index or pointer arranged radially with relation to the surfaces of said dials, two of said members being angularly adjustable with relation to the other and independently of each other, substantially as specified.

3. An indicator having a graduated time-dial, a station-dial of less diameter than and arranged contiguous to the graduated surface of the time-dial, and mounted for rotary movement coaxially therewith, said station-dial being provided with concentric route-lines divided to form intervals representing distances between stations, and an index or pointer mounted coaxially with the station-dial for traversing the surfaces of the dials, substantially as specified.

4. An indicator having a graduated time-dial, a station-dial provided with concentric route-lines representing train speeds of different rates per hour and each divided to represent the relative intervals between successive destination-points of a road, and an index or pointer arranged radially with relation to said dials, two of said members being angularly adjustable with relation to the other, substantially as specified.

5. An indicator having a time-dial, a station-dial mounted for coaxial rotary movement upon the time-dial, means for clamping the station-dial at the desired angular adjustment, a pointer mounted for angular adjustment coaxially with the station-dial, and means, independent of said clamping devices, for securing the index at the desired adjustment, substantially as specified.

6. An indicator having a time-dial provided with a central post, a station-dial mounted for rotary adjustment upon said post, a clamp-nut threaded upon the post for securing the station-dial at the desired adjustment, a pointer mounted upon the post coaxially with the station-dial, and means for maintaining said index at the desired angular adjustment, substantially as specified.

7. An index having a time-dial, a tubular post rising from the time-dial, a station-dial mounted for rotary adjustment upon the post, and an index or pointer having a spindle fitted in the bore of said post and frictionally held against accidental adjustment, substantially as specified.

8. An indicator having a time-dial, a hollow post rising from the time-dial, a station-dial mounted upon said post, means for clamping the station-dial at the desired adjustment, an index or pointer having a hub provided with an angular opening, and a spindle for the index having a split pin fitted in the bore of said post for frictional contact with the surface thereof, an angular shoulder to engage the opening in the hub of the index, and an exposed knob by which motion may be communicated to the index, substantially as specified.

In testimony that I claim the foregoing as my own I have hereto affixed my signature in the presence of two witnesses.

MORGAN JOLLY.

Witnesses:
C. W. MORTON,
W. SMITH.